June 6, 1961 D. A. VAN SCOY 2,986,959
TAPPING MACHINE
Filed April 30, 1959 4 Sheets-Sheet 1

Davis A. Van Scoy
INVENTOR.

BY
ATTORNEYS

June 6, 1961 D. A. VAN SCOY 2,986,959
TAPPING MACHINE
Filed April 30, 1959 4 Sheets-Sheet 2

Davis A. Van Scoy
INVENTOR.

BY Browning, Simmons, Hyer
& Eickenroht
ATTORNEYS

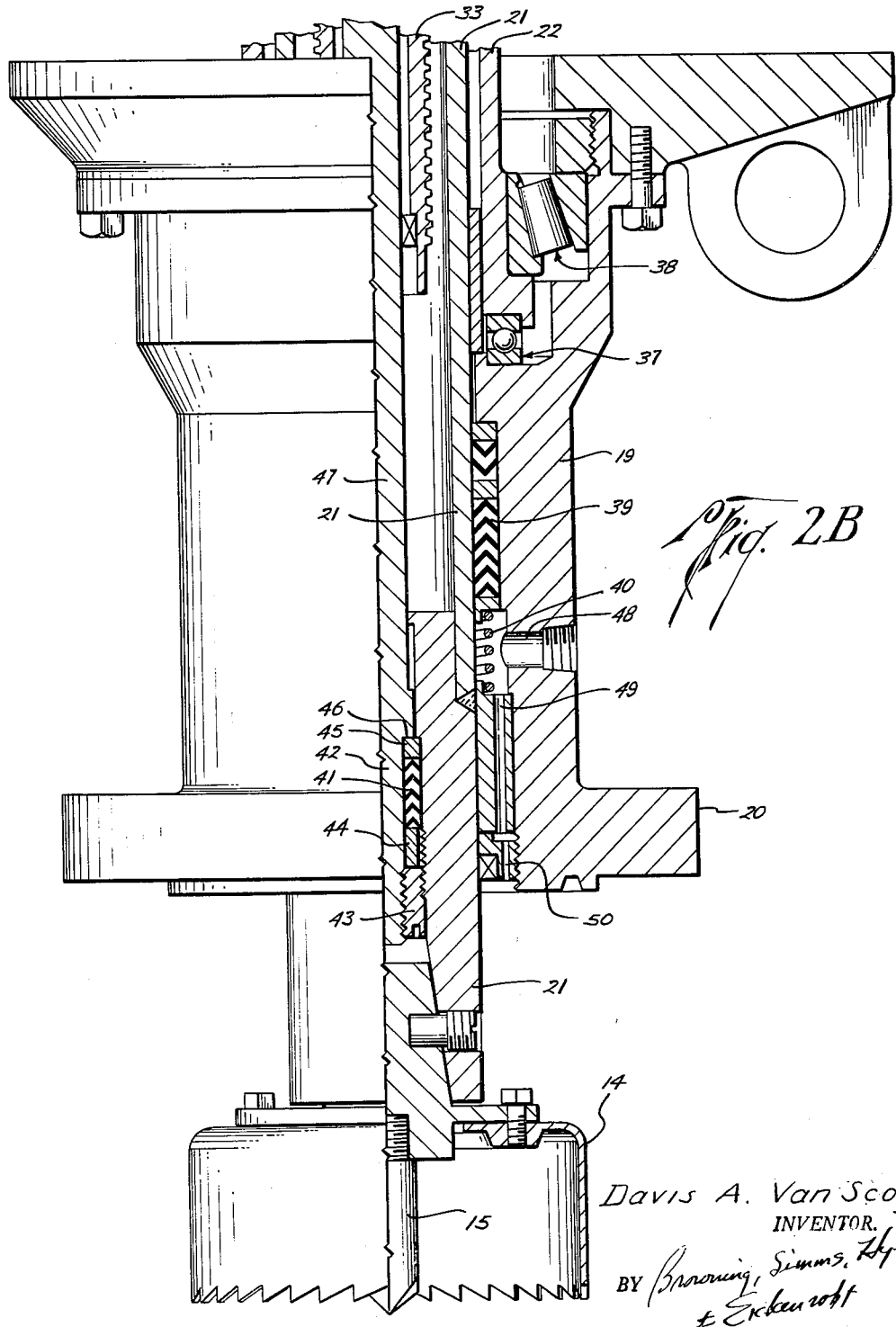

Davis A. Van Scoy
INVENTOR.

United States Patent Office 2,986,959
Patented June 6, 1961

2,986,959
TAPPING MACHINE
Davis A. Van Scoy, Houston, Tex., assignor to T. D. Williamson, Inc., Tulsa, Okla., a corporation
Filed Apr. 30, 1959, Ser. No. 810,129
13 Claims. (Cl. 77—42)

This invention relates to an improved apparatus for "hot" tapping a hole or opening in a pressure vessel such as a pipe or the like. The term "hot tapping" is used to denote a type of machine which can tap or cut an opening in the wall of a vessel while preventing flow of fluid into or out of the vessel during the cutting operation.

There are many instances in which the hot tapping of a vessel is desirable. For instanse, hot taps are often resorted to in connecting into a pipeline bearing petroleum or other fluid so as not to be forced to shut down the pipeline, drain and steam the same and then place it back in operation after the connection has been made. Hot taps are also used to cut an opening into the pipeline through which a plug can be insterted temporarily to plug the pipeline while repairs are being made thereto. Conventionally these hot taps are made by first welding a stub pipe or split T to the vessel or pipeline into which the tap is to be made, and then mounting a valve on the stub or T. The tapping apparatus is next mounted on the valve and a cutter run through the open valve to cut the opening in the vessel or pipe. After the opening has been cut, the cutter is withdrawn along with the cut-out coupon, the valve is closed and then the tapping apparatus can be removed without any leakage of fluid from or into the vessel.

While different styles of tapping apparatus for performing this function are available upon the open market today, they are subject to several disadvantages, particularly when manufactured so as to be able to tap large holes in large diameter pipelines. As the diameter of the pipeline increases, it is usually necessary to increase the length of the tapping apparatus and to also increase the size of the power drive for rotating and feeding the cutter. There are several reasons for this. First, it is usually desirable for the cutter diameter to be such that a relatively large hole is tapped into the pipeline. For the larger pipelines, this necessitates a relatively longer cutter travel during the cutting operation than for a smaller diameter pipeline. Moreover, as the pipeline diameter increases, the face to face distance of the block valve mounted on the side outlet through which the cutter must operate will also increase. Further, in some operations, it is desirable to cut coaxial holes on opposite sides of the pipeline, thereby necessitating even greater cutter travel. As a result of these and other factors, the tapping apparatus can become quite long when designed for use with large diameter pipelines.

In one style of tapping apparatus, the power drive mechanism is mounted on the upper end thereof. As this drive mechanism must become heavier with increasing diameter of pipeline, it may become necessary to provide a separate support for the upper end of the tapping apparatus and this is particularly true when the tap is being made at an angle other than the vertical. Moreover, controls for the tapping apparatus are usually situated on the power drive mechanism and this may necessitate the operator being a considerable distance up in the air where there may be increased hazard in operating the apparatus.

While tapping apparatus has been designed with the power drive situated near the lower end thereof, in order to lessen the above difficulties, such apparatus has been relatively complex in design and not of a compact, sturdy arrangement such as to best withstand the rough treatment received in the field.

It is a general object, therefore, of this invention to provide an improved tapping apparatus in which the power drive mechanism for rotating and feeding the cutter is situated adjacent the lower end of the apparatus and yet the apparatus is relatively compact and may be disposed in a single elongated housing.

Another object is to provide such an apparatus in which the various elongate driving and driven elements are arranged concentrically with each other and the power consumed in the cutting operation is transferred from a drive mechanism located near the bottom of the aparatus to the top via a driving element and then back down to the point of cutting via a driven element whereby some of the elements can move through the drive mechanism without interfering with the operation of the apparatus.

Another object of the invention is to provide such an appartus in which the element transferring power to the top of the apparatus as well as the apparatus for rotating and feeding the cutter are all elongated elements arranged concentrically within each other whereby they tend to support each other in proper axial alignment.

Another object of the invention is to provide a tapping apparatus with a power drive mechanism situated adjacent the lower end thereof, the drive mechanism being so arranged that the power required for rotating the cutting tool and for feeding it longitudinally during the cutting operation, as well as that required for rapid or fast movement of the cutting tool to and from the cutting operation, can be derived from a single power shaft and yet the cutting operation and the fast feeding operation cannot be inadvertently combined.

Another object is to provide such an apparatus arranged so that the cutting tool cannot be rotated backwards by any manipulation, accidental or purposeful, of the controls for the apparatus.

Other objects, advantages and features of the invention will be apparent to one skilled in the art upon consideration of the specification, claims and the attached drawings wherein:

FIG. 2B is a partial cross-sectional view of the lower portion of the apparatus and shows a cutter attached thereto.

Figures 1, 1A:
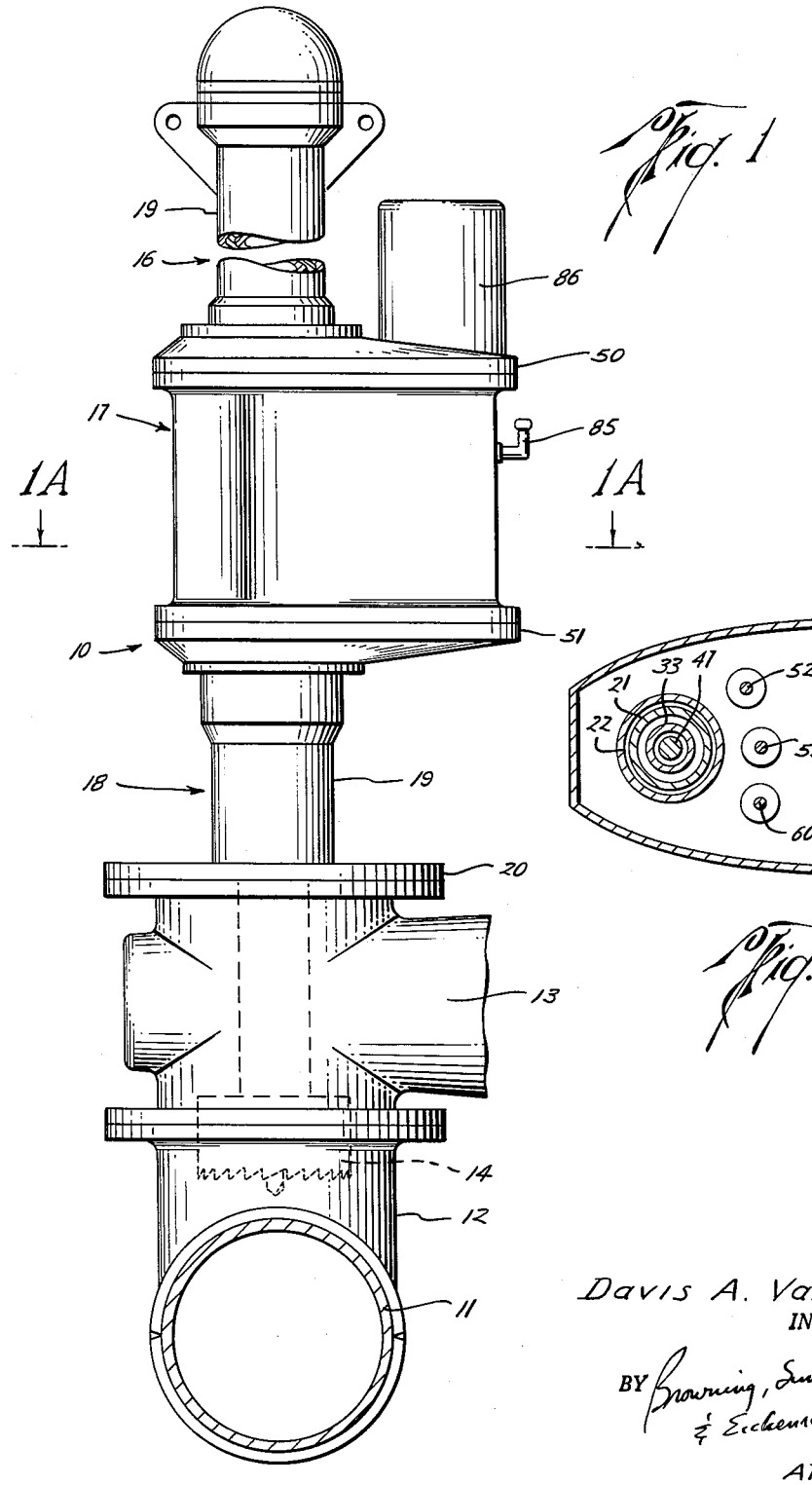
FIG. 1 is an elevational view of one embodiment of the tapping apparatus of this invention showing it mounted on a pipeline ready to begin a tapping operation.
FIG. 1A is a somewhat schematic view taken on line 1A—1A of FIG. 1 to indicate the arrangement of the various drive tubes and shafts of the drive mechanism.

Referring now to FIG. 1, the tapping apparatus 10 is shown mounted upon a pipeline 11 ready to begin the tapping operation. The pipeline has previously had a split T 12 welded thereto upon which a block valve 13 is mounted. The tapping apparatus is in turn mounted on the block valve by any suitable means. In beginning the tapping operation, the cutter 14 is advanced through the open valve 13 until it is adjacent to or touching the pipeline. A pilot drill 15 first drills a hole into the pipeline to aid in stabilizing cutter 14 which thereafter cuts the opening in the pipeline. The pilot drill 15 may be equipped with suitable means for retaining the cut coupon thereon so that upon retraction of the cutter, the coupon will also be removed. After such cutting operation is completed, the cutter is retracted and the valve closed whereupon the tapping apparatus can be removed.

As indicated in FIG. 1, the tapping apparatus comprises three sections, an upper section 16, a power drive section 17 and a lower section 18. It will be understood that the upper section will usually be several times as long as the combined lengths of the power drive and lower sections so that essentially the power drive section is mounted adjacent the lower end of the apparatus.

The apparatus includes the housing 19 having a lower end adapted to form a fluid tight connection with the vessel to be tapped as by a conventional flange 20 attached thereto.

Disposed within the housing is a rotatable boring bar 21 having its lower end formed so as to have the cutter 14 connected thereto. It will be noted that a major portion of the length of the boring bar extends above the drive mechanism 17 when the boring bar is in its retracted position as shown in the drawings.

Means are provided for rotating the boring bar at a cutting speed and at the same time feeding it into the work piece during the cutting operation. The rotating means can include a boring bar drive tube 22 having a connection, such as gear 23, at its lower end so as to be rotatable by the drive mechanism. This drive tube extends to the upper end of housing 19 where it is rotably mounted by a pair of bearings 24. These bearings have a portion 25 of this drive tube disposed therebetween and are themselves disposed between a pair of shoulders 26 and 27 carried by sleeve 28. The sleeve itself is keyed to a part 29 fixed to the feed screw drive tube 30 to be more fully described hereinafter.

A connection is provided between the boring bar drive tube and the boring bar permitting the boring bar to reciprocate longitudinally relative to such tube so that the boring bar can be extended and retracted from the housing to perform the cutting operation. Such connection is here shown as including a pair of keys 31 carried by the boring bar and slidable in keyways 32 cut in the inner surface of the boring bar drive tube. With this construction, it will be apparent upon rotation of the boring bar drive tube 22, the boring bar 21 will be rotated and yet can be advanced and retracted with respect to the vessel to be tapped.

The means for so advancing and retracting the boring bar can be termed a feeding means and is here shown to include a feed screw 33 having a threaded engagement with a threaded portion or nut 34 carried by the boring bar. The feed screw is connected to rotatable sleeve 28 which in turn is fixed, via part 29 to the feed screw drive tube 30. The latter has a connection, such as sprocket 35 at its lower end with the power mechanism. With this construction, it will be evident that by rotating the feed screw drive tube relative to the boring bar drive tube, nut 34 and hence the boring bar can be made to travel along the feed screw and therefore the boring bar can be advanced or retracted. As will be more apparent hereinafter, the drive mechanism provides both a "fast" and a "slow" speed for moving the boring bar, the "slow" speed being used to feed the cutter into the work piece during the cutting operation and the "fast" speed being used to rapidly advance and retract the cutter to and from cutting position. The fast speed is provided by disconnecting the boring bar drive tube and the boring bar from the drive mechanism and connecting the feed screw drive tube thereto so that it rotates at a relatively high rate of speed.

Figure 2A:
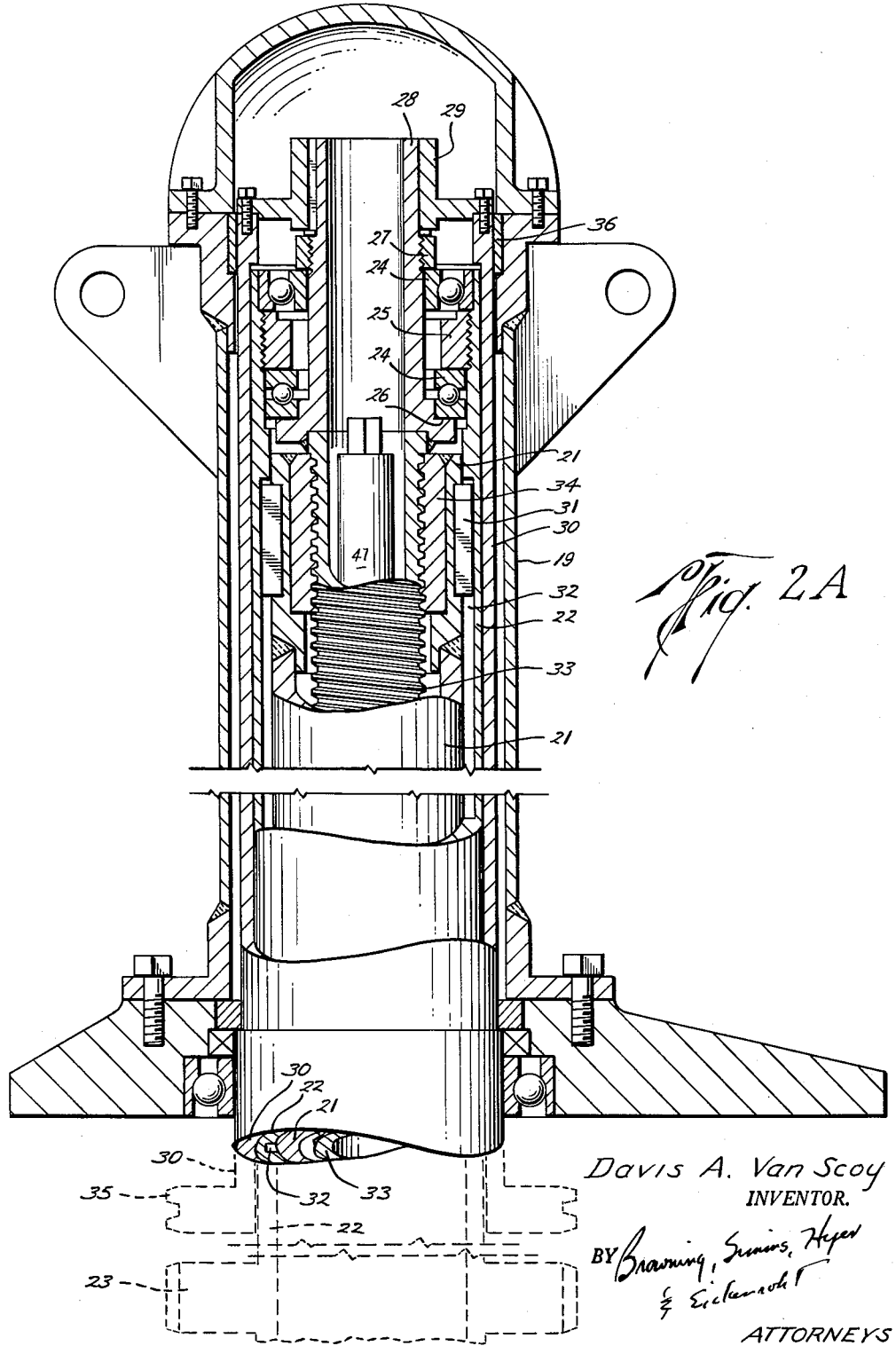
FIG. 2A is a view, partially in section, of the upper portion of the tapping apparatus.

With left hand threads on the feed screw as shown, rotation of sprocket 35 in a counterclockwise direction, viewed from the bottom of the apparatus shown in Fig. 2A, will cause the boring bar to be advanced and, of course, rotating in a clockwise direction will cause it to be retracted.

The feeding of the boring bar at a cutting or relatively slow rate of speed while rotating the boring bar at its proper cutting speed is accomplished by rotating the feed screw drive tube 30 at a slightly greater speed than the boring bar drive 22 is rotated. The difference in speed will determine the rate at which the boring bar is fed into the work piece. As will be explained later, the differential in rotating speeds is provided by the power mechanism. Suffice it to say at this point that the cutter may take many revolutions for each single revolution of the feed screw relative to nut 34. The rate of cutter feed can be varied over a wide range by changing the relative rotational speed of the two drive tubes, the pitch of the threads on the feed screw or both.

It will also be apparent that right hand threads can be used on the feed screw and nut in which case the above considerations will apply except that the direction of rotation will be reversed.

From Fig. 2A, it will be seen that the boring bar and feed assemblies just described are formed so that they can be slipped as an assembled unit upwardly into the upper end of the feed screw drive being journaled in the housing as by bearing 36. To prevent endwise movement of the assembly and particularly to take end thrust caused by the cutter during the cutting operation, the boring bar drive tube 22 can be extended into the lower housing part where it is journaled for rotation but prevented from moving endwise by bearings 37 and 38.

Seal means are provided at the lower end of the housing to prevent leakage of fluid from the vessel being tapped to the exterior of the apparatus. Such means can include packing 39 between the boring bar and housing and urged into sealing position by a spring 40. In the particular arrangement shown, the boring bar is tubular to receive the feed screw and therefore a seal means 41 and a plug 42 are provided at the bottom end to seal the bore of the boring bar. In the particular arrangement shown, an annular nut 43 is threaded to both the boring bar and plug 42 and exerts a force on packing 41 via a spacer 44. The upper end of the packing is confined by another spacer 45 which bears against the shoulder 46 on the plug. The plug can then have an extension 47 which can terminate adjacent the top of the apparatus so that upon turning the extension, the packing 41 can be tightened without dismounting the tapping apparatus from the pipeline.

It will be noted that the lower end of the housing is provided with a tapped opening 48 below seal 39 and this communicates with the sealed in space below flange 20 via passage 49. This permits a valve to be connected with port 48 so that after the tapping operation is completed and the main block valve is closed, any high pressure fluid trapped between the main block valve and the tapping machine can be bled off to facilitate removal of the tapping machine.

The drive mechanism for rotating the boring bar and feed screw drive tubes will be understood to be located near the lower end of the tapping apparatus between upper and lower cover plates 50 and 51 (FIG. 1). As indicated in FIG. 2A, the tubes have a sprocket 35 and a gear 23 situated within this portion of the housing and a portion of these two elements are illustrated in FIG. 2C which is a developed view of the drive mechanism.

The general drive mechanism comprises three drive trains having a common driving shaft. One drive train connects between the common shaft and the boring bar drive tube while the other two connect between the common shaft and the feed screw drive tube. One of the latter trains is for moving the boring bar at "slow" or cutting speed while the other is for moving it at "fast" speed. Clutch means are so provided in the drive trains so that the trains for driving the fast feed screw drive train cannot be operative at the time the other two trains are operative. Also, a means, such as an overrunning clutch, is provided in the boring bar tube drive train so that upon reversal of the comon drive shaft, while the boring bar drive train has been declutched, cannot result in counter-rotating the boring bar which would likely damage the cutter.

Figure 2C:
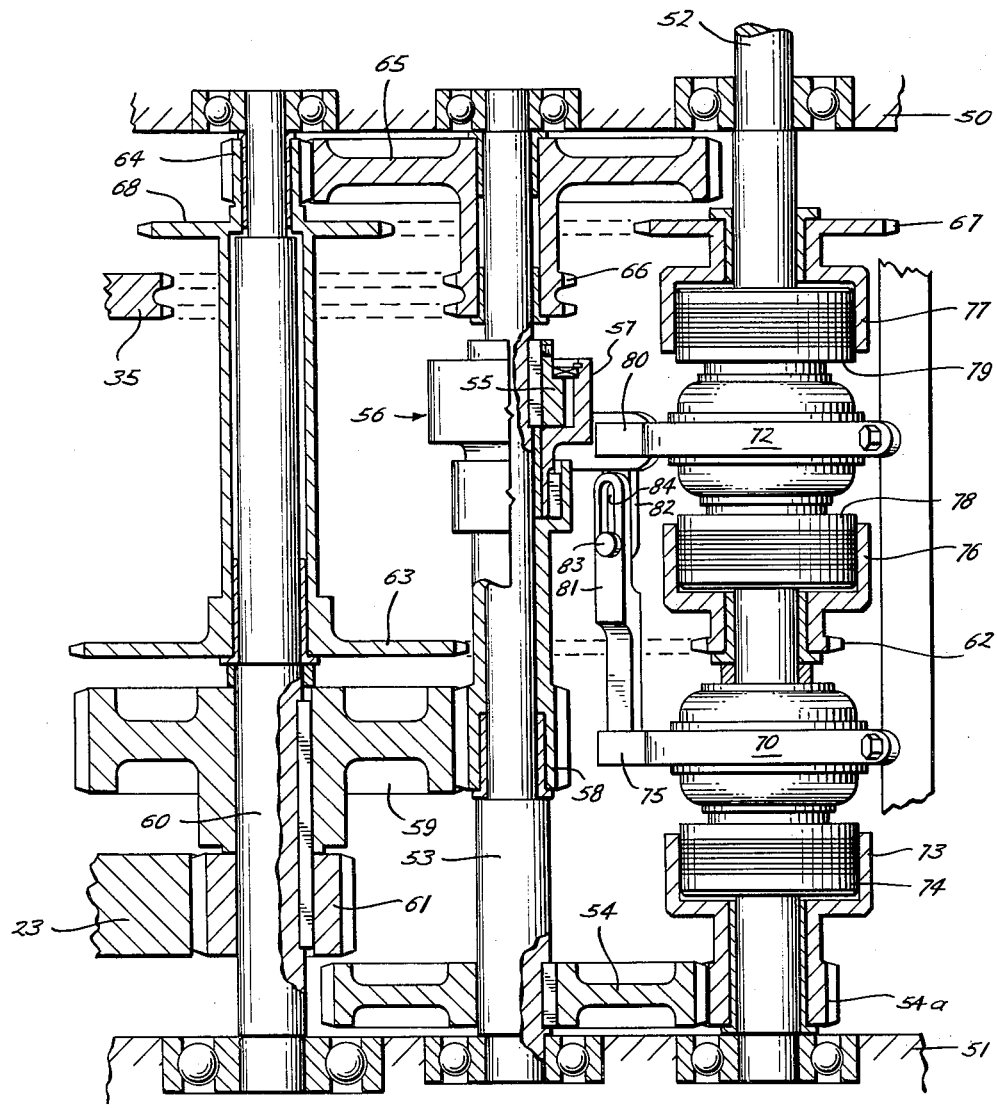
FIG. 2C is a developed view of the driving mechanism which is situated between the portions of the apparatus shown in FIGS. 2A and 2B.

Referring now to FIG. 2C, the boring bar drive train includes a gear 54a floating or rotatably mounted upon the common drive shaft 52. This gear drives a shaft 53 via gear 54 keyed thereto which in turn rotates a part 55 of an overrunning clutch 56. When part 55 is being rotated in the proper direction, it in turn will drive part 57 of the overrunning clutch to rotate gear 58. It will be noted that overrunning clutch part 57 and gear 58 are floating upon shaft 53 so that upon reversal of direction of rotation of this shaft, these parts will not be driven. The final drive to gear 23 on the boring bar drive tube is via a gear 59 keyed to shaft 60 which in turn is keyed to a gear 61.

With this arrangement, it will be seen that when gear 54a is turned in a proper direction, the overrunning clutch will be turned in the proper direction to cause rotation of the gears connecting it with the boring bar drive tube, but that any opposite rotation of gear 54a will cause the overrunning clutch to interrupt the drive of the boring bar drive tube. By properly sizing the various interconnecting gears in this train, any desired speed of rotation of the boring bar can be obtained for a relatively higher speed rotation of the common drive shaft 52.

The drive train for rotating the feed screw drive tube at the relatively slow speed for advancing the cutter during its cutting operation includes a sprocket 62 which likewise is floating upon common drive shaft 52. This sprocket is chained to sprocket 63 which is floating upon shaft 60 but which is connected to a gear 64 which likewise is floating upon this shaft. The latter gear drives gear 65 which is floating on shaft 53 to in turn drive a double sprocket 66 which is chained to the feed screw drive tube sprocket 35. By properly sizing the various sprockets and gears in this train, the feed screw drive tube can be made to turn at the proper speed relative to the boring bar drive tube to advance the boring bar by the threaded arrangement as described above.

The third or fast speed drive train again begins with a sprocket 67 floating upon the common drive shaft 52. This sprocket is chained to another sprocket 68 which is drivingly connected to a gear 64 as is sprocket 63 and thus the balance of this drive train is common with that of the slow speed drive train. With the relative sizing of the sprockets shown in the drawings, it will be evident that the fast speed drive train will rotate the feed screw drive tube at a much higher rate than will the slow speed drive train.

Clutch means are provided in the three drive trains in such a manner that when the boring bar drive train and the slow feed drive train are being employed to rotate the boring bar and to feed it into the work piece, the fast feed drive train is de-clutched so as to be inoperative to drive the feed screw drive tube. However, upon shifting of the clutch means to drive the fast feed drive train, the boring bar drive train and the slow speed drive train are positively de-clutched in order to prevent rotating the cutter while it is being fed at the fast rate and also to avoid locking of the mechanism by simultaneous actuation of the fast and slow feed drive trains.

In the specific embodiment shown, the clutch means comprises a single clutch 70 and a double clutch 72. The single clutch includes a clutch part 73 fixed to gear 54a and a clutch part 74 which is keyed to the common drive shaft 52. Upon swinging clutch arm 75 downwardly in FIG. 2C, clutch parts 73 and 74 will engage to provide a driving connection between the common shaft 52 and gear 51. In the position shown, however, the clutch parts are not in clutching engagement and clutch parts 74 can rotate with shaft 52 without rotating gear 54a. Gear 62 and sprocket 67 are likewise connected to clutch parts 76 and 77 which are respectively engageable with clutch parts 78 and 79 which are keyed to shaft 52. With clutch arm 80 positioned as shown in the drawing, the clutch is in an intermediate or neutral position and neither of clutch parts 76 nor 77 are being rotated. Upon movement of clutch lever 80 downwardly in the drawing, clutch parts 76 and 78 will engage to drivingly connect the common drive shaft 52 with a slow speed drive train. Upon movement of the clutch lever upwardly in the drawing, clutch 77 and 79 will engage to drive the fast speed drive train.

In order to positively actuate clutches as explained above by a single control, a lost motion connection is provided between clutch arms 75 and 80. This connection can take the form of links 81 and 82 respectively connected to the clutch arms and interconnected by a pin 83 sliding in slot 84. The arrangement is such that with both clutches in neutral position as shown, pin 83 is at the end of slot 84 nearest the single clutch 70. Then upon movement of clutch arm 80 downwardly, clutch arm 75 will likewise be moved downwardly at the same time. However, upon returning of clutch arm 80 to neutral position, clutch arm 75 will also return to neutral position and the slot arrangement above described permits clutch arm 80 to be moved upwardly without also moving clutch arm 75 upwardly. Of course, it will be understood that the clutches contain biasing means tending to return them to neutral position upon removal of force from the clutch arms. In this regard, the clutch means are conventional products readily available on the open market.

Clutch arm 80 can be suitably connected by a linkage to an external clutch shifting lever 85 (FIG. 1) to operate the clutches.

Referring now to FIG. 1A, the concentric arrangement of the feed screw, the boring bar and the boring bar drive tube is illustrated somewhat diagrammatically. The feed screw drive tube will likewise be concentrically arranged with these elements but is not shown in FIG. 1A because it terminates near the upper end of the drive mechanism housing. The placement of the common drive shaft 52 and the shafts 53 and 60 are also illustrated in FIG. 1A. However, the interconnecting gearing, clutches, etc. have been omitted for the sake of clarity.

As shown in FIG. 1, a suitable motor 86 is mounted on the apparatus and is connected with the common drive shaft 52. Other arrangements are possible, the prime purpose being to provide a driving means for the drive shaft 52.

While the operation of the apparatus is evident from the foregoing description, a brief resume will be given for the sake of completeness.

With the tapping apparatus mounted as shown in FIG. 1, and valve 13 open, clutch lever 85 is shifted so that the fast feed drive train is clutched to the common driving shaft and the other two driving trains are de-clutched therefrom. Motor 86 then rapidly drives the cutter through the valve toward the work piece. During this movement, the feed screw is rotating while the boring bar is not. While no positive means have been provided to hold the boring bar from rotating, the inertia and frictional resistance in the boring bar assembly and in the driving train connected thereto will be sufficient to prevent any substantial rotation. As soon as the cutter 14 is positioned proximate the work piece, lever 85 is shifted so as to de-clutch the fast speed drive train and to clutch the slow speed drive train and the boring bar drive train to the common driving shaft. This causes the boring bar to rotate at proper cutting speed while at the same time the feed screw is being driven at a speed such that the desired relative rotation between it and nut 34 is accomplished to yield the desired flow cutting feed of the cutter into the work piece.

As soon as the cutting operation is completed, lever 85 is shifted to de-clutch the boring bar and slow speed drive trains and to clutch the fast speed drive train to the common shaft. At this time, the direction of rotation of the common shaft is reversed, as by reversing motor 86 or by other suitable means. This causes the boring bar to be retracted at a relatively high rate of speed. It carries the coupon cut from the pipeline upwardly with it and as soon as the cutter clears the valve 13, the latter can be closed and the tapping apparatus removed from the pipeline.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for tapping an opening in a vessel such as a pipe or the like while maintaining the interior of the vessel isolated from the atmosphere exteriorly thereof which comprises, in combination, an elongate housing having its lower end adapted to form a fluid tight connection with the vessel to be tapped, a power drive mechanism carried by the housing adjacent said lower end and including a reversibly rotatable power input shaft, an elongate feed screw within the housing and extending above the drive mechanism, a feed screw drive tube within the housing having a driving connection adjacent its lower end with the drive mechanism and a driving connection adjacent its upper end with the upper end of the feed screw to rotate the same, a boring bar coaxial with the drive screw and having a driving connection therewith such that upon relative rotation between the boring bar and drive screw, the bar is advanced and retracted through the lower end of the housing, and means, drivingly connecting the power input shaft of the power drive mechanism with the boring bar, for rotating the boring bar at a speed differing from that of the drive screw and in one direction only.

2. The apparatus of claim 1 in which the driving connection between the drive mechanism and boring bar includes a boring bar drive tube connected at its lower end with the drive mechanism and above its lower end to the boring bar.

3. The apparatus of claim 2 wherein the connection between the boring bar drive tube and the boring bar includes a keyway and a key slidably disposed therein providing relative longitudinal movement between the boring bar drive tube and boring bar but limiting relative rotation therebetween.

4. The apparatus of claim 1 wherein the last mentioned means comprises an overrunning clutch.

5. An apparatus for tapping an opening in a vessel such as a pipe or the like while maintaining the interior of the vessel isolated from the atmosphere exteriorly thereof which comprises, in combination, an elongate housing having its lower end adapted to form a fluid tight connection with the vessel to be tapped, a boring bar assembly including a boring bar in the housing and extending above the lower end thereof when the boring bar is retracted therein, a feed assembly in the housing and connected to the boring bar to advance and retract the same responsive to rotation of the feed assembly relative to the boring bar, and a drive mechanism carried by the housing adjacent the lower end thereof including a reversibly rotatable power input shaft, first and second drive trains respectively connected to the boring bar assembly and feed assembly for rotating the boring bar at a cutting speed and also the feed assembly relative to the boring bar to feed the latter toward the vessel to be tapped, first clutch means between the power input shaft and the drive trains to engage and disengage the latter from the drive shaft, a third drive train connected to the feed assembly to rotate it to relatively rapidly advance and retract the boring bar, and second clutch means for engaging the third drive train with the drive shaft when the first clutch means has disengaged the first and second drive trains therefrom and vice versa whereby the boring bar can be advanced and retracted to and from cutting position at a relatively high rate of speed.

6. The apparatus of claim 5 in combination with an overrunning clutch in the first drive train preventing counter-rotation of the boring bar upon reversal of direction of rotation of the power input shaft.

7. The apparatus of claim 6 wherein the feed assembly includes a rotatable feed screw threaded to the boring bar and extending above the drive assembly in the housing, a feed screw drive tube coaxial with the feed screw and connected at its upper end to the upper end of the feed screw to rotate the latter and wherein both the second and third drive trains are connected to the feed screw drive tube at its lower end.

8. The apparatus of claim 7 wherein the boring bar assembly includes a boring bar drive tube coaxial with the boring bar and feed screw, and a connection between the boring bar drive tube and boring bar providing relative longitudinal movement between the boring bar and drive tube but preventing relative rotation therebetween.

9. An apparatus for tapping an opening in a vessel such as a pipe or the like while maintaining the interior of the vessel isolated from the atmosphere exteriorly thereof which comprises, in combination, an elongate housing having its lower end adapted to form a fluid tight connection with the vessel to be tapped, a boring bar assembly within the housing, a feed assembly in the housing and connected to the boring bar to advance and retract the same responsive to actuation of the feed assembly, and a drive mechanism carried by the housing adjacent the lower end thereof including first and second drive means respectively connected to the boring bar assembly and to the feed assembly to rotate the boring bar and to actuate the feed assembly to cause it to feed the boring bar toward the vessel to be tapped, a third drive means connected to the feed assembly to actuate it at a higher speed than does the second drive means whereby the boring bar can be advanced and retracted at a greater rate of speed, said drive means having a common power input shaft, clutch means in each of said drive means to interrupt its actuation of the respective boring bar and feed assemblies connected thereto, and means for disengaging the clutch means in the first and second drive means upon engaging the clutch means in the third drive means and vice versa.

10. The apparatus of claim 9 in combination with an overrunning clutch in the first drive means disposed to apply driving power to rotate the boring bar in one direction only.

11. The apparatus of claim 9 wherein the clutch means in the second and third drive means is a double clutch having a clutching element common to the second and third drive means arranged so that with said part in one position, one drive means is clutched while the other is positively declutched and with said part in another position, the reverse is true whereby both the second and third drive means cannot be driving the feed assembly at the same time.

12. An apparatus for tapping an opening in a vessel such as a pipe or the like while maintaining the interior of the vessel isolated from the atmosphere exteriorly thereof which comprises, in combination, an elongate housing having its lower end adapted to form a fluid tight connection with the vessel to be tapped, a power drive mechanism carried by the housing adjacent said lower end thereof and having at least two power outputs, a boring bar and feed screw coaxially arranged with each other in the housing and having a drive connection therebetween which advances and retracts the boring bar responsive to relative rotation between the boring bar and feed screw, coaxial boring bar and feed screw drive tubes each extending upwardly in the housing above the drive mechanism and respectively having a separate driving connection at its lower end with the power outputs of the drive mechanism to be rotated thereby, a connection between the upper ends of the feed screw drive tube and feed screw whereby the former can rotate the latter, and a connection between the boring bar drive tube and boring bar permitting the boring bar to move longitudinally relative to the boring bar drive tube but limiting relative rotation therebetween.

13. An apparatus for tapping an opening in a vessel such as a pipe or the like while maintaining the interior of the vessel isolated from the atmosphere exteriorly thereof which comprises, in combination, a tubular housing having its lower end adapted to form a fluid tight connection with the vessel to be tapped, a reversible power drive mechanism carried by the housing adjacent said lower end thereof, coaxial feed screw and boring bar drive tubes extending upwardly in the housing above the drive mechanism with the boring bar drive tube being inside the feed screw drive tube and each tube having a driving connection with the drive mechanism to be rotated thereby, a tubular boring bar inside the boring bar drive tube and having a connection adjacent its upper end with the boring bar drive tube permitting the boring bar to move longitudinally relative to the boring bar drive tube but limiting relative rotation therebetween so that the boring bar can be rotated by the boring bar drive tube while being advanced and retracted, a feed screw within the boring bar drivingly connected to the feed screw drive tube and having a threaded connection thereto so that upon relative rotation therebetween, the boring bar can be advanced and retracted toward and away from the vessel to be tapped.

References Cited in the file of this patent

UNITED STATES PATENTS

| | | |
|---|---|---|
| 2,833,167 | Mueller | May 6, 1958 |
| 2,838,964 | Albertson et al. | June 17, 1958 |